Aug. 10, 1965

J. E. ANDERSON 3,200,233

METHOD FOR GENERATING AN ARC

Filed Feb. 4, 1963

INVENTOR.
JOHN E. ANDERSON
BY
ATTORNEY

INVENTOR.
JOHN E. ANDERSON
BY
ATTORNEY 3,200,233
METHOD FOR GENERATING AN ARC
John E. Anderson, Indianapolis, Ind., assignor to Union
Carbide Corporation, a corporation of New York
Filed Feb. 4, 1963, Ser. No. 256,082
6 Claims. (Cl. 219—74)

This invention relates to a method for producing a transferred arc and, more particularly, to a completely new and novel method for producing a restricted arc at the work.

Electric arcs of the type here being discussed have been used in welding, cutting, and other metal working processes. In the usual situation, an arc of extremely high current density is formed between a non-consumable electrode and a workpiece. In addition, there are times when a gas is passed down around the electrode and through a nozzle with the arc being directed to the work.

Processes similar to the one described above have been used extensively for welding. However, in welding with such an arc process there is the problem of undercutting the weld. Undercutting is defined by the American Welding Society in their "Welding Handbook," Fourth Edition, Section 1, as "A groove melted into the base metal adjacent to the toe of the weld and left unfilled by weld metal."

Experience indicates that one of the contributing factors causing undercutting is that of the forces imposed by the arc at the workpiece. These forces are derived, at least in part, from arc pumping. In prior art arcs where the arc is spread or "fanshaped," these forces are quite severe, with the result that undercutting is severe. Assuming that the welding conditions are selected for obtaining the necessary penetration, the first limitation on the speed with which the weld can be made is undercutting. That is to say, in order to eliminate or minimize undercutting, welding speed had to be reduced.

Another problem that is associated with welding is that of achieving narrow weld beads. Achieving narrow weld beads inherently means that the heat source to the metal will be more concentrated. This results in less distortion of the metal and consequently advantageous for welding.

I have discovered that by reversing the flow of arc gas in electric arc working apparatus, I can produce an extremely narrow arc column wherein the difference in pressures along such arc column is reduced with the consequence that the arc forces are remarkably minimized.

Accordingly, it is the main object of this invention to provide a process for producing a transferred arc that is restricted at the workpiece.

It is a further object to provide an arc process for electric welding.

Another object is to provide an electric arc welding process which substantially reduces the arc forces at the workpiece so as to allow increased welding speeds without undercutting.

Yet another object is to provide an electric arc welding process which provides narrow weld beads.

These and other objects will become apparent from the following description and drawings wherein.

The novel process of the present invention will be described with reference to a welding arc process. However, the principles of the invention are effectively applied to cutting arcs, as well as other material heating arcs.

Briefly, according to the invention, there is provided a process for treating work by directing an arc from at least one electrode to such work and then passing a gas generally in a direction from the workpiece toward the electrode to thereby produce an arc effluent which is more restricted at the work than prior art arcs of substantially the same current.

Figure 1:
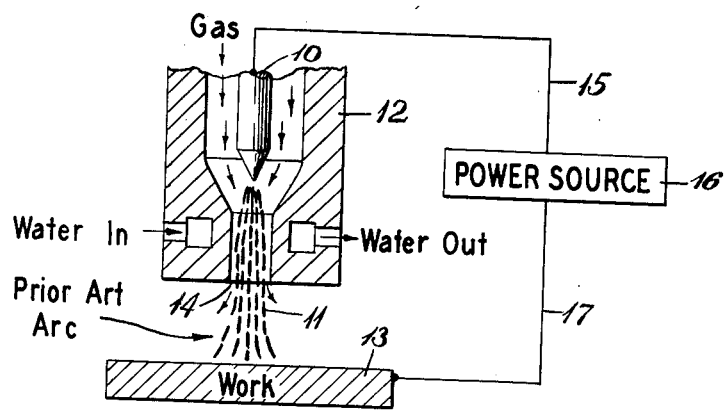
FIGURE 1 is a schematic of prior art apparatus for providing prior art fan-shaped arces.

Referring to FIG. 1, a typical torch used to establish a typical prior art arc consists of a stick electrode 10 and a water-cooled nozzle electrode 12 having a relatively small arc passage 14. An arc 11 can be maintained between electrode 10 and a workpiece 13 by first connecting power supply 16 to the electrode and the workpiece through leads 15 and 17. The arc is initiated by means of shorting across the electrodes with a carbon rod, for example, or by use of a high-frequency discharge. Alternating current or direct current with straight or reverse polarity may be used as desired.

Suitable materials for the electrode 10 are those having good electrical emissivity such as tungsten or tungsten containing thoria, and for the nozzle, good thermally conductive materials, such as copper, could be used. As another alternative, the stick electrode 10 could consist of an insert electrode such as described in copending application Serial No. 183,880, filed March 30, 1962.

The arc obtained in the prior art will be spread or fan-shaped as shown in FIG. 1. With such an arc the forces at the workpiece, due to arc pumping, will be quite severe. This seriously limits welding speeds. Further, when selected arc gases are passed around the electrode 10 and out nozzle passage 14, the same type of arc will be obtained. It has been discovered that when the flow of gas through a torch is reversed, the arc plasma is remarkably more narrow and restricted at the workpiece than the arc plasma obtained when gas is passed through the torch in the usual way. This results in a more restricted arc at the workpiece so as to reduce the forces at the workpiece. This, in combination with the reverse flow itself, reduces the forces of the arc and results in remarkable elimination of undercutting with the consequence that welding speeds are unexpectedly increased. Additionally, the restricted arc effluent yields a more concenterated heat source so as to yield a narrower weld bead.

The term "restricted" is used herein to convey the idea that the arc effluent, at the work, is markedly more confined than any prior art arc.

Figure 2:
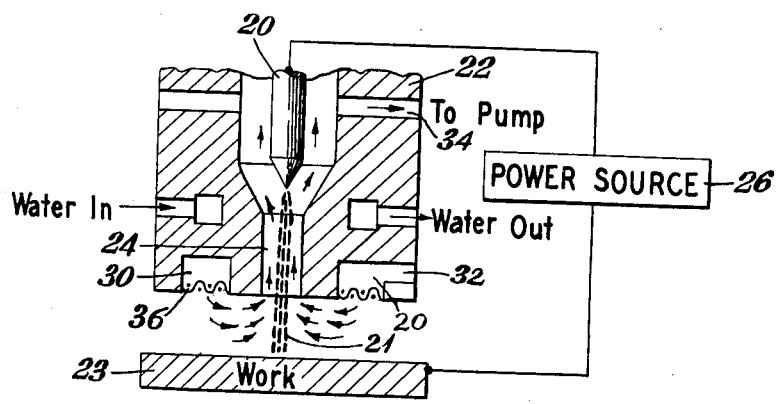
FIGURE 2 is a schematic of typical apparatus for obtaining the narrower, restricted arc of the invention.

Referring now to FIG. 2, typical apparatus for practicing the invention includes an electrode 20 and a water-cooled nozzle 22 having a relatively small arc passage 24. Energy for maintaining an arc between electrode 20 and the electrode workpiece 23 is supplied by source 26. Provided in the nozzle 22 is an annulus 30 which communicates with inlet passages 32. The nozzle 22 is also provided with passages 34 to which is connected a pump (not shown). Gas is supplied to passages 32 through annulus 30 and is then pulled up through the nozzle 22 by the pump. Thus, the flow of gas through the torch is said to be reversed since it now enters through what is usually the nozzle exit and leaves through what, up until now, was the entrance end.

Under these flow conditions, the arc plasma will be much more narrow and restricted at the workpiece. A gas lens 36 may be used in annulus 30 if desired.

While the invention has been described with reference to particular apparatus, it should be understood that the invention need not be so limited. For example, annulus 30 could be replaced by a plurality of conduits spaced around the nozzle passage 24.

The unexpected phenomenon on which the invention is predicted is obtainable with alternating or direct current with straight or reverse polarity. In addition, both reactive gases, such as oxygen and nitrogen, and inert gases, such as argon and helium, can be used; the gases being fed through the torch in either an axial or vortex fashion. This wide variety of uses can be illustrated by the following examples. In the examples, apparatus of the general type depicted in FIG. 2 was used.

EXAMPLE 1

Reverse flow with D.C.S.P. and inert gas

Figure 3:
FIGURES 3 to 10 are photographs of arcs discussed in Examples 1 to 5.
Figure 4:
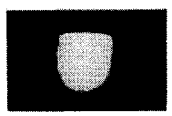

In this example, an arc of 100 amperes at about 30 volts was established between an 1/8 in. tungsten cathode and an anode workpiece (D.C.S.P.). The electrode was surrounded by a 3/16 in. diameter nozzle, the nozzle being spaced about 3/32 of an inch from the anode workpiece. Approximately 20 c.f.h. of argon gas was first passed down around the electrode, out through the nozzle in the manner of FIG. 1. FIGURE 3 shows the arc resulting from this condition magnified about 5.6 times. This type of flow was stopped and the flow (20 c.f.h.) reversed in the manner of FIG. 2; the gas being introduced axially into the torch. FIGURE 4 shows the arc resulting from this condition; again magnified about 5.6 times.

EXAMPLE 2

Reverse flow with D.C.S.P. and reactive gas

Figure 5:
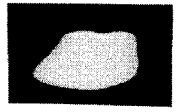
Figure 6:

Under the same conditions as Example 1, but with an arc of 90 amperes at 44–48 volts, 9.5 c.f.h. of nitrogen gas was put through the torch in the manner of FIG. 1 and then at 26 c.f.h. in the manner of FIG. 2. FIGURES 5 and 6 magnified about 6.8 times show the arcs resulting from the normal flow and the reverse flow, respectively.

EXAMPLE 3

Reverse flow with D.C.R.P.

Figure 7:
Figure 8:
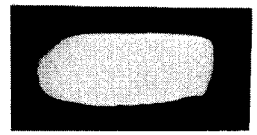

In this example the 3/16 in. nozzle of Example 1 was positioned 1/16 in. from the workpiece; the end of the central electrode being flush with the nozzle face. The electrode, which consisted of water-cooled copper, had a flat end rather than a pointed tip. With the central electrode acting as the anode, an arc of 70 amperes at 36–41 volts was established between the electrode and the cathode workpiece. Argon gas containing less than 5 percent oxygen by volume was introduced through the torch in the reverse manner of FIG. 2 at the rate of 34 c.f.h. FIGURE 7, magnified about 8 times, shows the resulting arc. When the flow was stopped, the arc spread out as shown in FIG. 8; the photograph again being magnified about 8 times.

EXAMPLE 4

Reverse flow with alternating current

Figure 9:
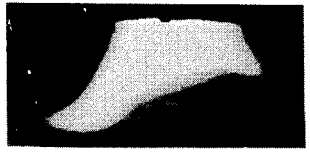
Figure 10:

The apparatus was essentially the same as that used in Example 1. An arc of 110 amperes, single phase alternating current, was established between the central electrode and the electrode workpiece. In order to insure a more stable arc on A.C. operation, the workpiece contained a 1/4 in. diameter piece of tungsten, pointed at the top in line with the central electrode. Argon gas, at the rate of 13 c.f.h., was introduced through the torch in the manner of FIG. 1. FIGURE 9, magnified about 5 times, shows the resulting arc. The black portion of the arc is the piece of tungsten used to stabilize the arc. Argon was then fed through the torch at the rate of 9 c.f.h. in the manner of FIG. 2. FIGURE 10, magnified about 5 times, shows the resulting arc.

EXAMPLE 5

Welding with reverse flow

Figure 11:
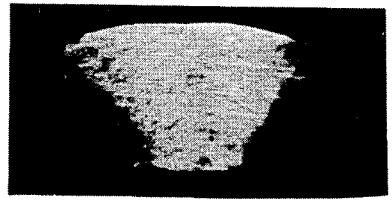
FIGURES 11 and 12 are photographs of welds made with prior art arcs and with the arc of the invention.
Figure 12:
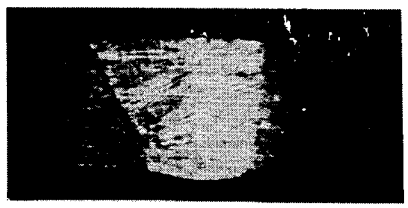

In this example, apparatus similar to that used in Example 1 was used. To show the utility of reverse flow for welding, bead-on-plate tests were made on a 15 in. x 6 1/4 in. x 1/8 in. type 304 stainless steel plate. With the plate acting as the anode, an arc of 265 amperes at 26.5–27 volts was established between it and the central electrode. The welding speed was 20 i.p.m. Argon gas, at the rate of 5 c.f.h. was fed through the torch in the manner of FIG. 1. FIGURE 11 shows the resulting weld bead. This bead is wide and has undercutting at the edges of the bead. The flow was then reversed at the rate of 15 c.f.h. With an arc of 300 amperes at 20–26 volts, and at the same weld speed of 20 i.p.m., a weld bead as shown in FIG. 12 resulted. Both photographs were magnified about 7 times.

As shown by the drawings, the weld made by the reverse flow arc is narrower. Also, the weld had no undercutting, whereas, the weld of FIG. 11 was found to have severe undercutting.

While the principles of the invention have been described with reference to the preferred embodiment, it is to be understood that the same principles may be applied to other arc working processes without departing from the spirit and scope of this invention.

What is claimed is:

1. Process for treating a workpiece which comprises directing an arc from at least one electrode to said work; passing gas generally in a direction from the work to the electrode to affect restriction of the arc at the work.

2. A process for work-in-circuit electric arc welding which comprises directing a welding arc from an electrode to a workpiece to be welded; passing a gas generally in a direction from the workpiece to the electrode to affect restriction of the arc at the work.

3. A process for work-in-circuit electric arc working with a device including an electrode and a gas directing nozzle in axial alignment with said electrode which comprises establishing an arc between said electrode and the work; and passing a gas stream through said nozzle toward the arching end of said electrode to thereby produce an arc which is restricted at the work.

4. An electric arc work-in-circuit welding process which comprises establishing a welding arc between an electrode in axial alignment with, and spaced from, one end of a gas directing nozzle and a workpiece; passing an arc gas around said arc and into said nozzle from the other end of said gas directing nozzle toward said electrode to thereby produce an arc which is restricted at the workpiece.

5. A process for work-in-circuit electric arc working with an arc torch device including an electrode and a water-cooled gas directing nozzle having an constricted outlet passage in axial alignment with said electrode which comprises establishing an arc between said electrode and the work; and passing an arc gas stream through said constricted outlet passage toward said electrode to thereby produce an arc which is restricted at the work.

6. Process for treating a workpiece which comprises directing an arc from at least one electrode to said work; passing gas vortically generally in a direction from the work to the electrode to affect restriction of the arc at the work.

References Cited by the Examiner

UNITED STATES PATENTS

| | | | |
|---|---|---|---|
| 2,284,648 | 6/42 | Foreman | 219—147 |
| 2,806,124 | 9/57 | Gage | 219—121 |
| 2,919,341 | 12/59 | Roth et al. | 219—74 |

RICHARD M. WOOD, *Primary Examiner.*